(12) United States Patent
Kobayashi et al.

(10) Patent No.: US 6,706,428 B2
(45) Date of Patent: Mar. 16, 2004

(54) CERAMIC SINTERED BODIES AND A METHOD OF PRODUCING THE SAME

(75) Inventors: Hiromichi Kobayashi, Yokkaichi (JP); Tsuneaki Ohashi, Ogaki (JP); Toshio Oda, Aichi-prefecture (JP); Hiroshi Furukubo, Ichinomiya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 10/059,053

(22) Filed: Jan. 28, 2002

(65) Prior Publication Data
US 2003/0027706 A1 Feb. 6, 2003

(30) Foreign Application Priority Data

Mar. 14, 2001 (JP) .................... P2001-071891
Dec. 13, 2001 (JP) .................... P2001-379962

(51) Int. Cl.$^7$ .............................. B32B 18/00
(52) U.S. Cl. ............ 428/698; 428/699; 428/408; 428/304.4; 428/307.3; 428/701; 428/702; 428/446
(58) Field of Search ................ 428/698, 699, 428/408, 304.4, 307.3, 701, 702, 446

(56) References Cited

U.S. PATENT DOCUMENTS

| 5,308,422 A | * | 5/1994 | Askay et al. ............. 156/89.28 |
| 5,561,321 A | * | 10/1996 | Hirano et al. ............... 257/700 |
| 6,227,127 B1 | * | 5/2001 | Yamaguchi et al. ......... 110/338 |

FOREIGN PATENT DOCUMENTS

JP 02-074669 * 3/1990 .......... D06M/11/78

OTHER PUBLICATIONS

"Metal Handbook," Sixth Revision, Maruzen Co., Ltd., pp. 1036–1037, May 2000.

* cited by examiner

Primary Examiner—Deborah Jones
Assistant Examiner—Vivek Koppikar
(74) Attorney, Agent, or Firm—Burr & Brown (57) ABSTRACT

A ceramic sintered body has a dense portion and a porous portion. The dense portion is formed from sintered ceramic fine particles, and the porous portion is formed from sintered ceramic coarse particles. The fine particles and coarse particles are simultaneously subjected to pressure sintering to form the dense portion and porous portion.

6 Claims, 8 Drawing Sheets

CERAMIC SINTERED BODIES AND A METHOD OF PRODUCING THE SAME

BACKGROUND OF THE INVENTION

1. Title of the Invention

The invention relates to ceramic bodies and a method for producing the same.

2. Related Art Statement

An integrated body of porous ceramics and dense ceramics are conventionally produced by various methods, including brazing, adhesion with an inorganic adhesive and co-sintering ("Metal Handbook" Sixth revision, Pages 1036 to 1037; MARUZEN CO., LTD.).

The present inventors have tried to join a dense sintered body and a porous sintered body both made of, for example, silicon carbide. Although a porous ceramic body and a dense ceramic body might be joined together by brazing, few brazing materials provide adequate strength to the surface of each ceramic body. When the porous ceramic body has a high porosity and relatively large open pores, brazing material may flow into the open pores to react with the ceramic materials and denature them. Such brazing material in the pores tends to further reduce the adhesive strength of the brazing material to the surface of the porous ceramics. Further, it is necessary to heat the brazing material to a temperature high enough to melt the material for bonding the porous and dense ceramic bodies. The subsequent step of cooling the molten brazing material may induce a residual stress so that the bonding strength is reduced or fluctuated. These problems may be also induced when bonding porous ceramic and dense ceramic bodies using a glass adhesive.

SUMMARY OF THE INVENTION

It is an object of the invention to provide an integrated ceramic body wherein the porous ceramics and dense ceramics are integrated with an adequately high bonding strength.

The present invention provides a ceramic sintered body comprising a dense portion and a porous portion. The dense portion is formed with sintered ceramic fine particles and the porous portion is formed with sintered ceramic coarse particles. The fine particles and coarse particles are subjected simultaneously to pressure sintering to form the dense portion and porous portion.

The invention also provides a method of producing a ceramic sintered body having a dense portion and a porous portion by subjecting ceramic fine particles and ceramic coarse particles simultaneously to pressure sintering.

The inventors have modified a so-called pressure sintering process and successfully simultaneously sintered ceramic fine particles and ceramic coarse particles to obtain an integrated sintered body having dense and porous portions. Such a pressure sintering process was performed under temperature and pressure conditions adapted for producing a highly sintered dense body of the fine particles and for simultaneously producing a porous body of the coarse particles.

Ceramic particles may be sintered by pressure sintering processes including hot pressing and hot isostatic press sintering. For example, various ceramic materials, such as silicon nitride, silicon carbide and aluminum nitride, have been manufactured by hot pressing.

According to the present invention, ceramic fine particles are used which may provide a dense sintered body with a pressure sintering process. The fine particles are subjected to a pressure sintering process simultaneously with ceramic coarse particles. The coarse particles are selected so as to produce a porous body under the same temperature and pressure conditions sufficient for producing a dense body of the ceramic fine particles. Consequently, the invention provides an integrated sintered body having a dense portion made from the fine particles and a porous portion made from the coarse particles, by a pressure sintering process.

In such a sintered body, the dense and porous portions are bonded and strongly integrated along a continuously extending interface when observed microscopically. Since the ceramic fine and coarse particles are subjected to sintering in both the dense and porous portions, residual stress along the interface of the dense and porous portions is relatively small. The bonding strength of the porous and dense portions is thus high, or stabilized, causing very few bonding defects.

The present invention may be generally applied to ceramics. Such ceramics include oxide ceramics, such as alumina, zirconia, titania, silica, magnesia, ferrite, cordierite, and the oxides of rare earth elements such as yttria, complex oxides such as barium titanate, strontium titanate, lead titanate zirconate, manganites of rare earth elements and chromites of rare earth elements, nitride ceramics such as aluminum nitride, silicon nitride and sialon, and carbide ceramics such as silicon carbide, boron carbide and tungsten carbide.

The average particle diameter of the ceramic fine particles is not particularly limited, as long as the fine particles may be sintered to produce a sintered body with the desired porosity under the predetermined temperature and pressure conditions during pressure sintering. The average diameter of the fine particles, however, is preferably not larger than 5 $\mu$m, and more preferably, not larger than 1 $\mu$m.

The average particle diameter of the ceramic coarse particles is not particularly limited, as long as the coarse particles may be sintered to produce a sintered body with the desired porosity under the predetermined temperature and pressure conditions during pressure sintering. Moreover, preferred average diameter of the ceramic coarse particles may be varied depending on the desired porosity. Generally the average diameter of the coarse particles is preferably not smaller than 40 $\mu$m, and more preferably, not smaller than 50 $\mu$m. The average diameter is preferably not larger than 400 $\mu$m and more preferably, not larger than 100 $\mu$m, in order to prevent the reduction of strength of the porous portion. The ratio of the porosity of the dense portion divided by the porosity of the porous portion is preferably not higher than 0.3, and more preferably, not higher than 0.01.

In a preferred embodiment, ceramic coarse particles are grindstones or abrasive grains used for grinding or polishing. It has not been known to subject these materials to pressure sintering simultaneously with fine particles. Alternatively, a ceramic sintered body may be coarsely ground to produce coarse particles, which are then passed through a mesh for regulating the particle size. The resultant coarse particles with the regulated particle size may preferably be used as the above ceramic coarse particles to be subjected to pressure sintering.

Ceramic fine particles and coarse particles may be granules containing a binder, or may be ceramic powder containing substantially no binder. It is possible to add a pore forming material to ceramic coarse particles. However, pressure sintering is normally carried out under sealed or closed conditions. It is therefore preferred to substantially avoid the addition of a pore forming material, which may adversely affect the sintering process under the sealed or closed conditions. In the present invention, the ceramic coarse particles with relatively large diameters are subjected to high pressure under high temperatures to strongly bond the coarse particles to each other and leave some pores, to an extent, between the coarse particles.

The porosity of the dense portion is preferably not higher than 10 percent, and more preferably, not higher than 5 percent, in order to improve the strength of the inventive sintered body. The lower limit of the porosity is not particularly limited, and may be 0 percent.

The porosity of the porous portion is preferably not lower than 10 percent, more preferably not lower than 15 percent, and most preferably, not lower than 20 percent, in order to utilize the inventive sintered body for a wide variety of applications. The porous portion having a porosity of not lower than 15 percent is particularly preferable, because such portion tends to have open pores that are continuous with each other so as to form a gas passage.

The porosity of the porous portion is preferably not higher than 40 percent, and more preferably, not higher than 30 percent, in order to improve the strength of the porous portion.

A metal part or metal member may be embedded within the inventive sintered body. The shape, kind, or function of such a metal member is not particularly limited. The metal member may, for example, be a bulky and plate-shaped member, or a metal film formed by printing. Such metal members are preferably made of a metal having a high melting point and which are stable at temperatures for sintering the ceramics. These metals include tantalum, tungsten, molybdenum, platinum, rhenium, hafnium, and the alloys of these metals.

The bulky material made of a metal constituting the metal member includes, for example, the following materials:

(1) A plate-shaped bulky material made of a metal; or
(2) A plate-shaped bulky material made of a metal having a number of small spaces formed in the material.

The material (2) includes a plate-shaped bulky body having a number of small openings and a wire netting or gauze. The plate-shaped body having a number of small openings includes an etching metal and punching metal.

A hot pressing system for ceramics includes, basically, a mechanism for applying a pressure and a mechanism for heating. The pressure-applying mechanism ordinarily includes a die and a punch. The following two properties are needed for a material for the pressure-applying mechanism: (1) the material has a mechanical strength sufficiently high to endure the applied predetermined pressure, and (2) the material does not chemically react with ceramic particles, even at the temperatures for heating ceramic particles or ceramic shaped body, for example at a temperature from 1000 to 2400° C. Such materials include, for example, graphite.

In a preferred embodiment, the ceramic fine particles and the ceramic coarse particles are made of the same kind of ceramic material. The present invention may provide an integrated structure having a porous portion and a dense portion which are made of the same kind of ceramic material and bonded strongly with each other. "The same kind of ceramic material" means that the main component of one ceramic material constituting the dense portion is same as that of the ceramic material constituting the porous portion. The component or components other than the main component, as well as trace components, may be different from each other. Inevitable impurities derived from raw materials may be also contained in each ceramic material. More preferably, not lower than 50 percent of ceramics constituting the porous portion, and not lower than 50 percent of ceramics constituting the dense portion, are of the same component. Most preferably, not lower than 80 percent of ceramics constituting the porous portion, and not lower than 80 percent of ceramics constituting the dense portion, are of the same component.

In a preferred embodiment, the porous portion and the dense portion are laminated in the direction that pressure is applied during pressure sintering. In this case, the interface between the porous portion and dense portion is formed in a crossing direction, or a direction that is substantially perpendicular to the direction of the applied pressure. It is thereby possible to improve the bonding strength of the porous and dense portions. The interface of the porous and dense portions may preferably be formed in the direction crossing the direction of the applied pressure at an angle of not lower than 45°, and more preferably not lower than 60°. Most preferably, the interface is substantially perpendicular to the direction of the applied pressure.

At least a part of the interface of the porous and dense portions may preferably be substantially parallel with the direction of a pressure applied during pressure sintering. The porous and dense portions tend to shrink differently and induce irregularities in the interface between the porous and dense portions. Such irregularities in the interface are prevented or avoided in the interface substantially parallel with the direction of the applied pressure.

When a hot isostatic pressing process is applied, however, pressure is applied on the ceramic shaped body in every direction surrounding the body. The above embodiment may therefore be applied to a process with a pressure substantially applied in a predetermined direction, such as hot pressing process.

DETAILED DESCRIPTION OF THE INVENTION

FIG. 1(a) is a cross sectional view schematically showing a sintered body 1 according to one embodiment of the present invention, and FIG. 1(b) is a perspective view showing the bottom face 1b and side face of the sintered body 1. 1a is a main face of the sintered body 1. The sintered body 1 is made of a porous portion 3 and a dense portion 2. The porous portion 3 has a shape of a disk. The dense portion 2 is composed of a disk-shaped portion 2a laminated on the porous portion and a ring-shaped portion 2b surrounding the porous portion 3 and laminated portion 2a. The laminated portion 2a and the ring-shaped side wall portion 2b are continuously formed. The interface 20 of the laminated portion 2a and porous portion 3 is substantially perpendicular to a direction "A" of an applied pressure. The interface 21 of the side face of the porous portion 3 and dense portion 2 is substantially parallel with the direction "A".

Figure 2:
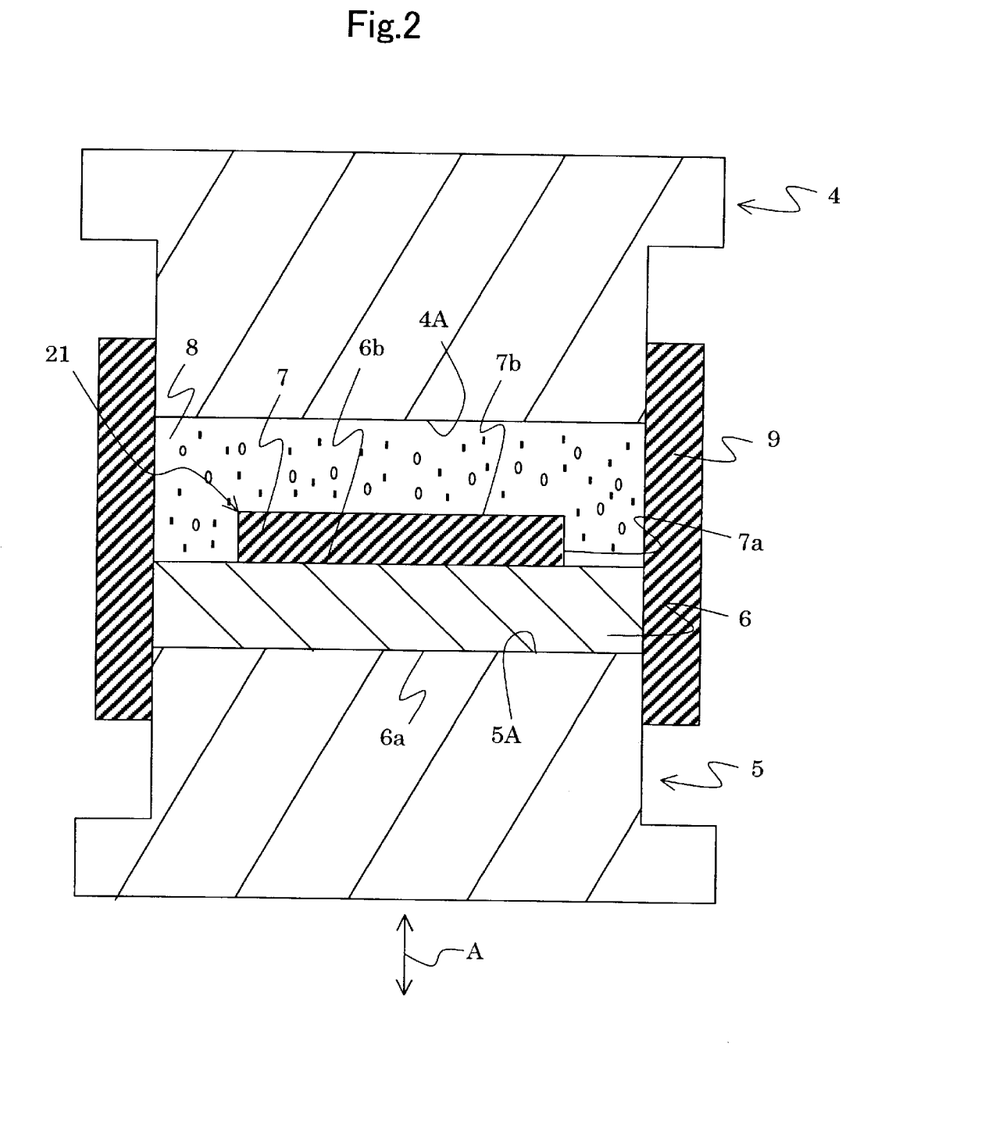
FIG. 2 is a cross sectional view schematically showing a primary shaped body 7, ceramic particles 8, and a system for shaping them by an uniaxial pressure shaping process.
Figure 3:
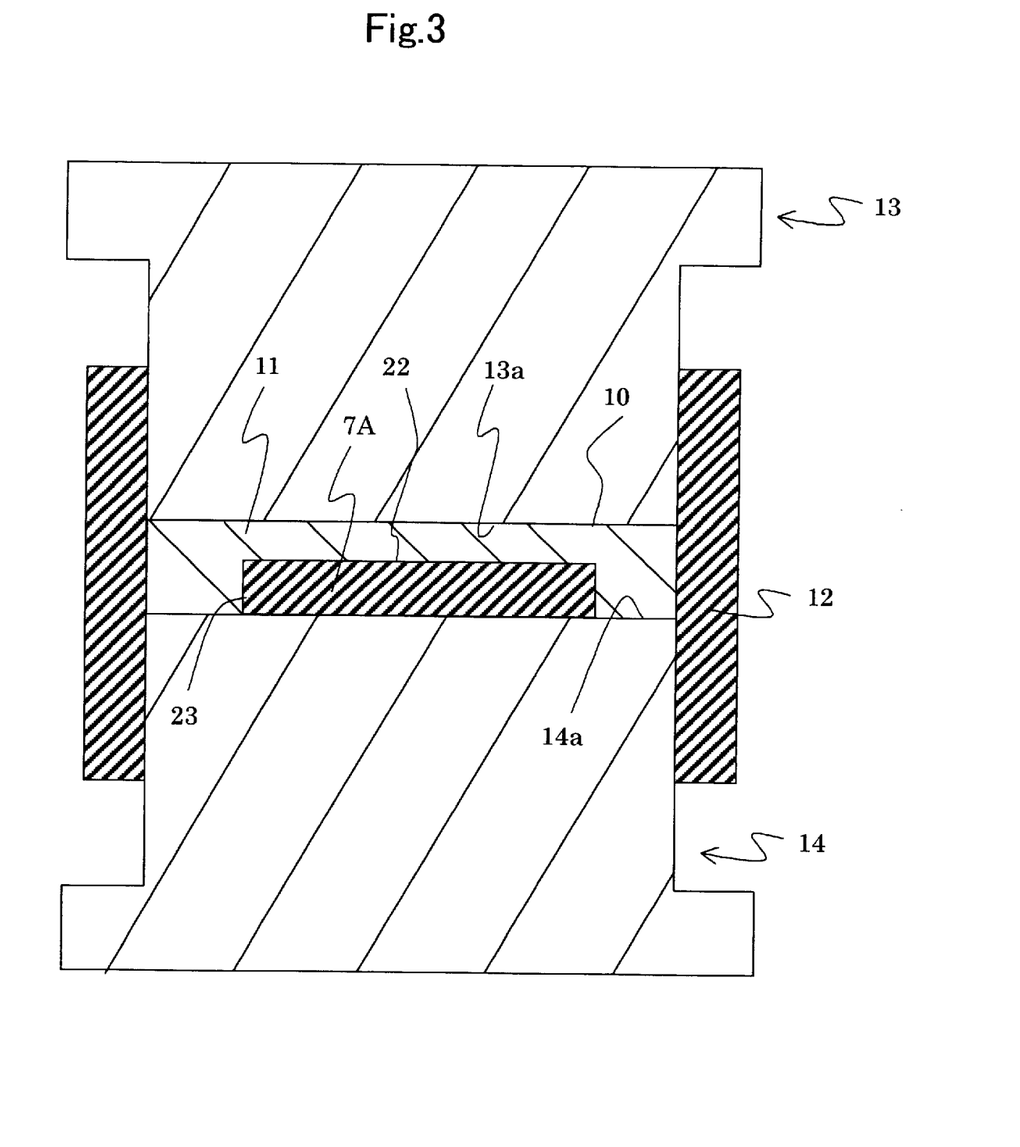
FIG. 3 is a cross sectional view schematically showing a secondary shaped body 10 set in a mold for hot pressing.

The sintered body 1 may be produced according to a process explained referring to FIGS. 2 and 3. In a preferred embodiment, ceramic coarse particles are subjected to pressure shaping to obtain a primary shaped body 7. Although the shaped body 7 has a shape of a disk in this example, its shape is not particularly limited. The primary shaped body 7 is contained in a mold system for pressure shaping schematically shown in FIG. 2. This mold system has an upper punch 4, a lower punch 5, and a sleeve 9. In the example, the primary shaped body 7 is mounted on the main face 6b of a supporting body 6 to form a laminated body 21.

The main face 6a of the supporting body 6 is mounted on the shaping face 5A of the lower punch 5. The supporting body 6 has an outer diameter substantially fit with the inner diameter of the sleeve 9. The primary shaped body 7 has a diameter slightly smaller than the inner diameter of the sleeve 9 and the outer diameter of the shaping face 5A. Ceramic fine particles 8 are filled between the side face 7a of the primary shaped body 7 and the sleeve 9, and on the main face 7b of the primary shaped body 7. It is possible to mount a sheet, made of a material which is not reactive with the ceramic fine and coarse particles, on the upper supporting face 6b of the supporting body 6. The sheet is inserted between the supporting body 6 and the fine and coarse particles.

The upper punch 4 is then driven downwardly so as to apply a pressure on the body 7 and fine particles 8 in a direction "A" with the shaping face 4A of the upper punch 4 and shaping face 5A of the lower punch 5. A secondary shaped body 10, shown in FIG. 3, is thus obtained. The secondary shaped body 10 has a shaped body 7A made of the coarse particles and a shaped body 11 made of the fine particles. The shaped body 11 covers the main (upper) face and side face of the shaped body 7A.

In a preferred embodiment, as described above, ceramic coarse particles are shaped to obtain a primary shaped body, which is then subjected to pressure shaping with ceramic fine particles to obtain a secondary shaped body. The secondary shaped body is then subjected to pressure sintering. The above process is advantageous for preventing the irregularities of the interface between the coarse particles and fine particles in a shaped body before the pressure sintering. When the coarse and fine particles are subjected to pressure shaping without preliminary shaping the coarse particles, irregularities may be induced in the interface of the coarse and fine particles in a shaped body.

The resulting secondary shaped body 10 is then set within a space formed by, for example, a shaping face 13a of an upper punch 13, a shaping face 14a of a lower punch 14 and a sleeve 12 for hot pressing. In this stage, the supporting body 6 may be removed from the secondary shaped body.

Alternatively, the secondary shaped body 10 laminated with the supporting body 6 may be subjected to hot pressing without removing the body 6. When hot pressing is performed, the interface 22 of the ceramic fine particles and coarse particles is substantially perpendicular to a direction of a pressure applied during the hot pressing and the interface 23 is substantially parallel with the direction of the applied pressure.

FIG. 4(a) is a cross sectional view of a sintered body 1A according to another embodiment, and FIG. 4(b) is a perspective view of the sintered body 1A. The sintered body 1A has a porous portion 3A with a shaped of a disk and a ring-shaped dense portion 2A surrounding the porous portion 3A. In this example, main faces 3a and 3b of the disk-shaped porous portion 3A are exposed. In other words, the porous portion 3A is continuous from one main face 1a to the other main face 1b of the sintered body 1A. 21 is an interface of the porous portion 3A and dense portion 2A. The interface 2A is substantially parallel with the direction "A" of the applied pressure.

In the present invention, a porous portion may be made from two or more kinds of coarse particles with the different average particle diameters. In this embodiment, the coarse particles constituting a region near the dense portion preferably have an average particle diameter smaller than that of the coarse particles constituting a region distant from the dense portion. The porosity of the region near the dense portion may thereby be reduced compared to that of the region distant from the dense portion.

Figure 5:
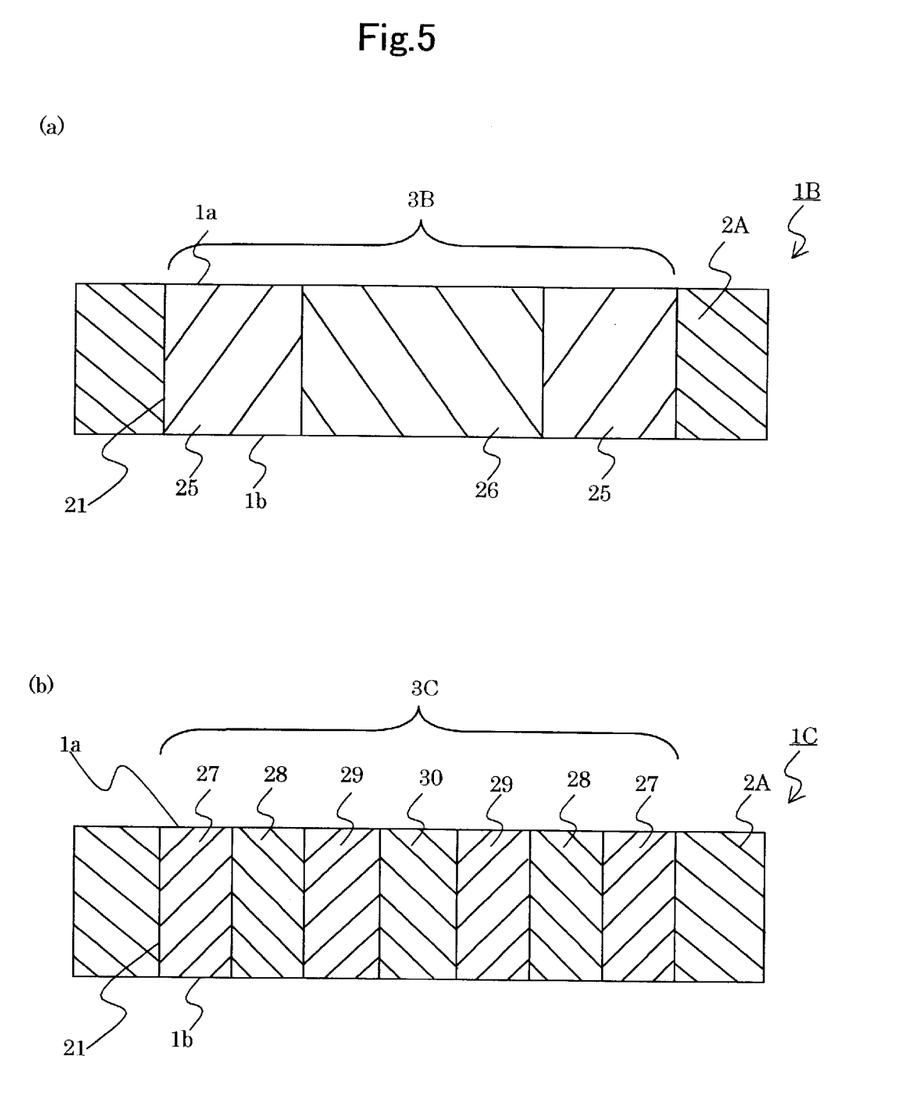
FIG. 5(a) is a cross sectional view showing a sintered body 1B.
FIG. 5(b) is a cross sectional view showing a sintered body 1C.

For example, in a sintered body 1B shown in FIG. 5(a), the porous portion 3B has a disk-shaped region 26 and a ring-shaped region 25 surrounding the side of disk-shaped region 26. The ring-shaped region 25 is nearer to a dense portion 2A than the disk-shaped region 26. The average particle diameter of coarse particles constituting the ring-shaped region 25 may preferably be smaller than that of coarse particles constituting disk-shaped region 26. The porosity of the ring-shaped region 25 may thereby be made smaller than that of the disk-shaped region 26.

Further, as shown by the sintered body 1C of FIG. 5(b), the porous portion 3C may be divided into three or more regions, for example four regions 27, 28, 29 and 30. In a preferred embodiment, the average particle diameters of coarse particles constituting the regions are reduced in the descending order of the reference numerals 30, 29, 28 and 27. The porosities of the regions are thereby reduced in the descending order of the reference numerals 30, 29, 28 and 27. Further in another embodiment, the porosity of the porous portion may be sloped and continuously changed therein.

The maximum temperature during the pressure sintering process may be adjusted depending on the applied ceramics and the desired porosity. Generally, pressure sintering is carried out at a temperature of 1000 to 2400° C. The pressure during the sintering may be adjusted, and is generally 50 to 400 kg/cm$^2$.

The material of the supporting body is not particularly limited. When a supporting body is used during a pressure sintering process, the material for the supporting body may preferably have a melting point higher than the desired sintering temperature and is preferably not reactive with the ceramic materials. Such a material may preferably be boron nitride, carbon or the like. Further, the material may preferably be a metal with a high melting temperature, which does not melt at the sintering temperature, such as molybdenum, tungsten, tantalum, niobium, hafnium or the like. The material is most preferably carbon.

The surface of the sintered body according to the invention may be coated with another material, preferably a ceramic material. Particularly when a porous portion is made of grindstones or abrasive particles, the purity of the porous portion may be lower than that of the dense portion made by utilizing a powdery raw material for a fine ceramic application. In this embodiment, the surface region of the sintered body, or at least the surface region of the porous portion, may be coated with a ceramic film to improve the purity of the surface region. A high purity is required for at least the surface portion of the sintered body, when the sintered body is used, for example, in an application such as a system for manufacturing semiconductors. In such applications, it is particularly preferred to cover the surface region of the sintered body, or at least the surface region of the porous portion, with the above high purity ceramic film.

Although the material for the coated ceramic film is not particularly limited, such a material is preferably the same kind of material as the ceramic material constituting the sintered body. The coated film may be formed by processes including, but not particularly limited to, including chemical vapor deposition, physical vapor deposition, sputtering or the like.

EXAMPLES

Example "A"

Figure 1:
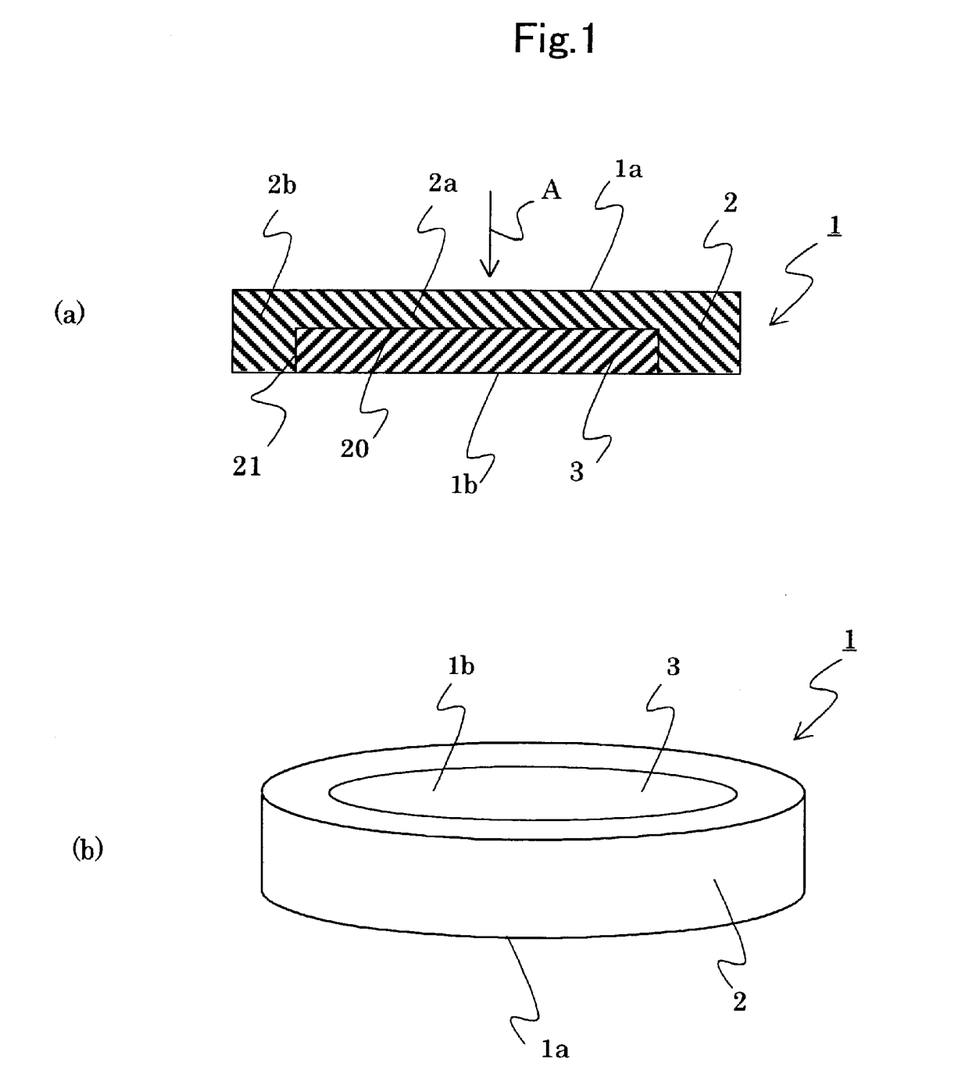
FIG. 1(a) is a cross sectional view schematically showing a sintered body 1 according to the present invention.
FIG. 1(b) is a perspective view showing the bottom face 1b and side face of a sintered body 1.

The sintered body shown in FIG. 1 was produced according to the process described above referring to FIGS. 2 and 3. Silicon carbide coarse particles (GC abrasive grains), with properties shown in table 1, were prepared.

TABLE 1

| | Example 1 | Example 2 | Example 3 | Example 4 | Example 5 |
|---|---|---|---|---|---|
| Silicon carbide coarse particle | NG36 | NG60 | NG100 | NG220 | #240 |
| Maximum particle diameter ($\mu$m) | 850~600 | 425~300 | 212~150 | 106~75 | 123 |
| Average particle Diameter ($\mu$m) | 400 | 250 | 120 | 75 | 57 |
| Minimum particle Diameter ($\mu$m) | 355 | 180 | 75 | 45 | 40 |
| SiC (weight %) | 99.2 | 99.2 | 99.4 | 99.2 | 96.0 |
| Free carbon (weight %) | 0.10 | 0.10 | 0.04 | 0.08 | 0.50 |
| Total iron content (weight %) | 0.07 | 0.06 | 0.05 | 0.08 | 0.30 |
| Application | Grind Stone | Grind stone | Grind stone | Grind stone | Abrasive grain |

The GC abrasive grains were mixed with a solution containing 5 percent of polyvinyl alcohol to obtain paste, which was then filled into a mold (circle), removed from the mold, and dried at 110° C. for two hours to obtain a primary shaped body 7. The primary shaped body 7 was set in a metal mold. Ceramic fine particles 8 of silicon carbide were mixed with $B_4C$ and carbon powder as sintering aids, and then filled in the metal mold to cover the side face and upper main face of the primary shaped body 7. The fine particles and primary shaped body were pressed at a compacting pressure of 200 kg/cm to obtain a secondary shaped body 10. The secondary shaped body 10 was subjected to hot press sintering with its maximum temperature during the sintering of 2200° C. and the holding time period at 2200° C. of 2 hours. The temperature rising (heating) rate and cooling rate were 100° C. per hour. The sintering was carried out in 100 percent argon.

Figure 6:
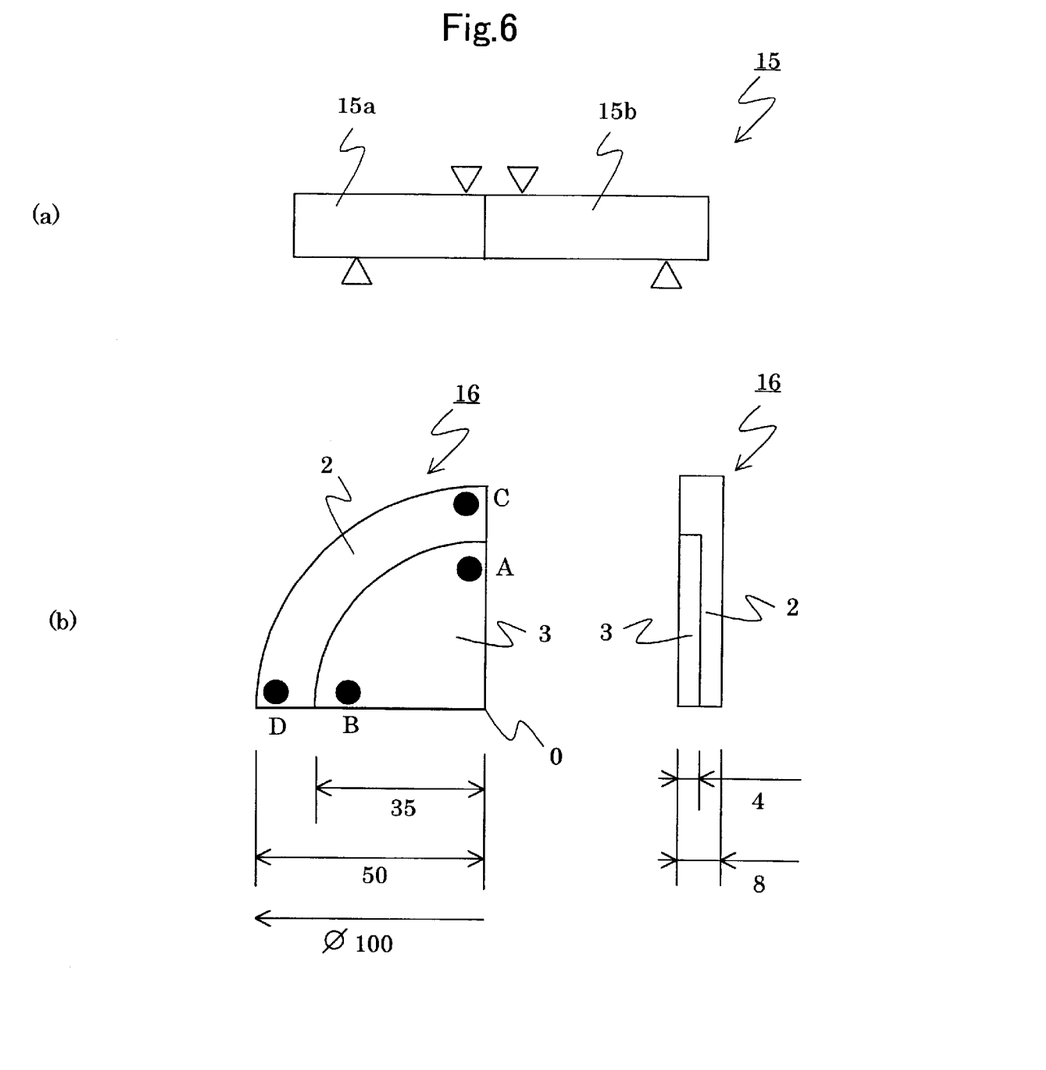
FIG. 6(a) shows a test sample 15 cut from a sintered body 1 for measuring strength using a four-point bending test.
FIG. 6(b) shows a plan view and side view of a sample cut from a sintered body 1 for measuring surface resistance.
Figure 7:
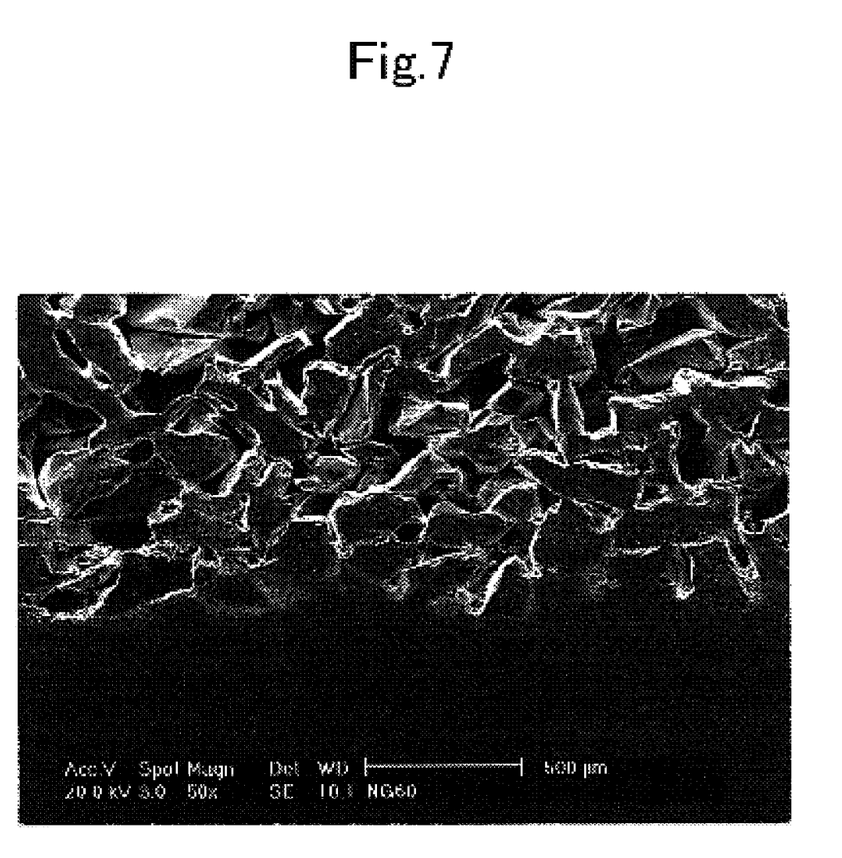
FIG. 7 is a photograph showing the microstructure of the bonding interface between the porous portion and the dense portion according to example 2.
Figure 8:
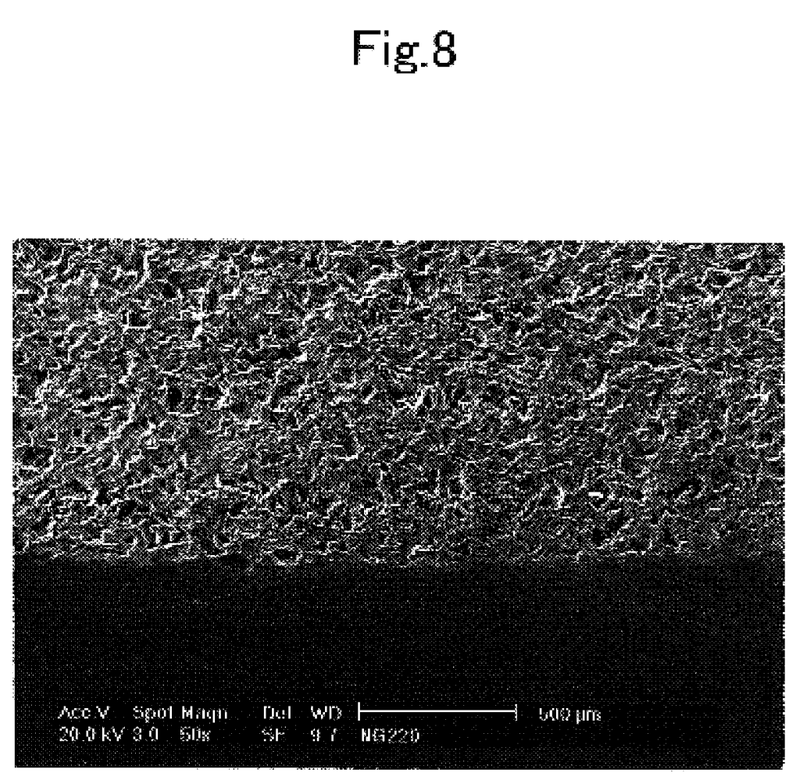
FIG. 8 is a photograph showing the microstructure of the bonding interface between the porous portion and the dense portion in a sintered body according to example 4.

The resulting sintered bodies 1 were cut to obtain rod-shaped samples 15 as shown in FIG. 6. 15a is its porous portion and 15b is its dense portion. The mechanical strength of each sample 15 was measured according to a four point bending method defined in "JIS R1601." The results are shown in Table 2. Moreover, the porosity of each of the porous and dense portions was measured by Archimedes method, and the results are shown in Table 2. The microstructure of each interface between the dense and porous portions of each of sintered bodies according to examples 2 and 4 is shown in FIGS. 2 and 4, respectively. The photographs were taken using a scanning electron microscope with a magnification of 50.

TABLE 2

| | Example 1 | Example 2 | Example 3 | Example 4 | Example 5 |
|---|---|---|---|---|---|
| Silicon carbide Coarse particle | NG36 | NG60 | NG100 | NG220 | #240 |
| Average particle diameter of silicon carbide coarse particle | 400 $\mu$m | 250 $\mu$m | 120 $\mu$m | 75 $\mu$m | 57 $\mu$m |
| Average particle diameter of silicon carbide fine particle | 1.6 $\mu$m | 1.6 $\mu$m | 1.6 $\mu$m | 1.6 $\mu$m | 1.6 $\mu$m |
| Maximum Temperature during Sintering (° C.) | 2200 | 2200 | 2200 | 2200 | 2200 |
| Pressure for Sintering kg/cm$^2$ | 200 | 200 | 200 | 200 | 200 |
| Atmosphere for Sintering | Argon | Argon | Argon | Argon | Argon |
| Porosity of porous Portion (%) | 24 | 24 | 26 | 27 | 27 |
| Porosity of dense Portion (%) | 0.18 | 0.10 | 0.06 | 0.07 | 0.06 |
| Four point bending Strength (MPa) | 110 | 130 | 200 | 240 | 300 |

As can be seen from the results, although the porous and dense portions were made of the same kind of material, each had considerably different porosities from each other. The dense portion was substantially densified to a considerably small porosity of not higher than 0.2 percent. At the same time, the porous portion had a sufficiently high porosity of 20 to 30 percent. The bonding strength of the dense and porous portions was relatively large.

Each sample 16, with the shape and dimensions shown in FIG. 6(b), was then cut from each sintered body. The sample 16 had a cross sectional shape of a fan with an angle of 90°. The sample had a porous portion 3 with a shape of a fan including the center "O" of the fan 16 and an arc-shaped dense portion 2 formed along the peripheral part of the porous portion 3. The porous portion 3 had a radius of 35 mm and a thickness of 4 mm. The sample 16 had a radius of 50 mm and a thickness of 8 mm. The dense portion 2 had a width of 15 mm.

The sample 16 was measured using a tester to obtain a surface resistance of 5 to 30 Mψ between points "A" and "B" and a surface resistance of 0.10 to 0.11 Mψ between points "C" and "D." The surface resistances of the porous and dense portions were different from each other by two-digit order. The surface resistance between points "A" and "D" was 2 to 16 Mψ, which was slightly lower than that of the porous portion alone. Such results are in conformity with the relatively low surface resistance of the dense portion.

Experiment "B"

Figure 4:
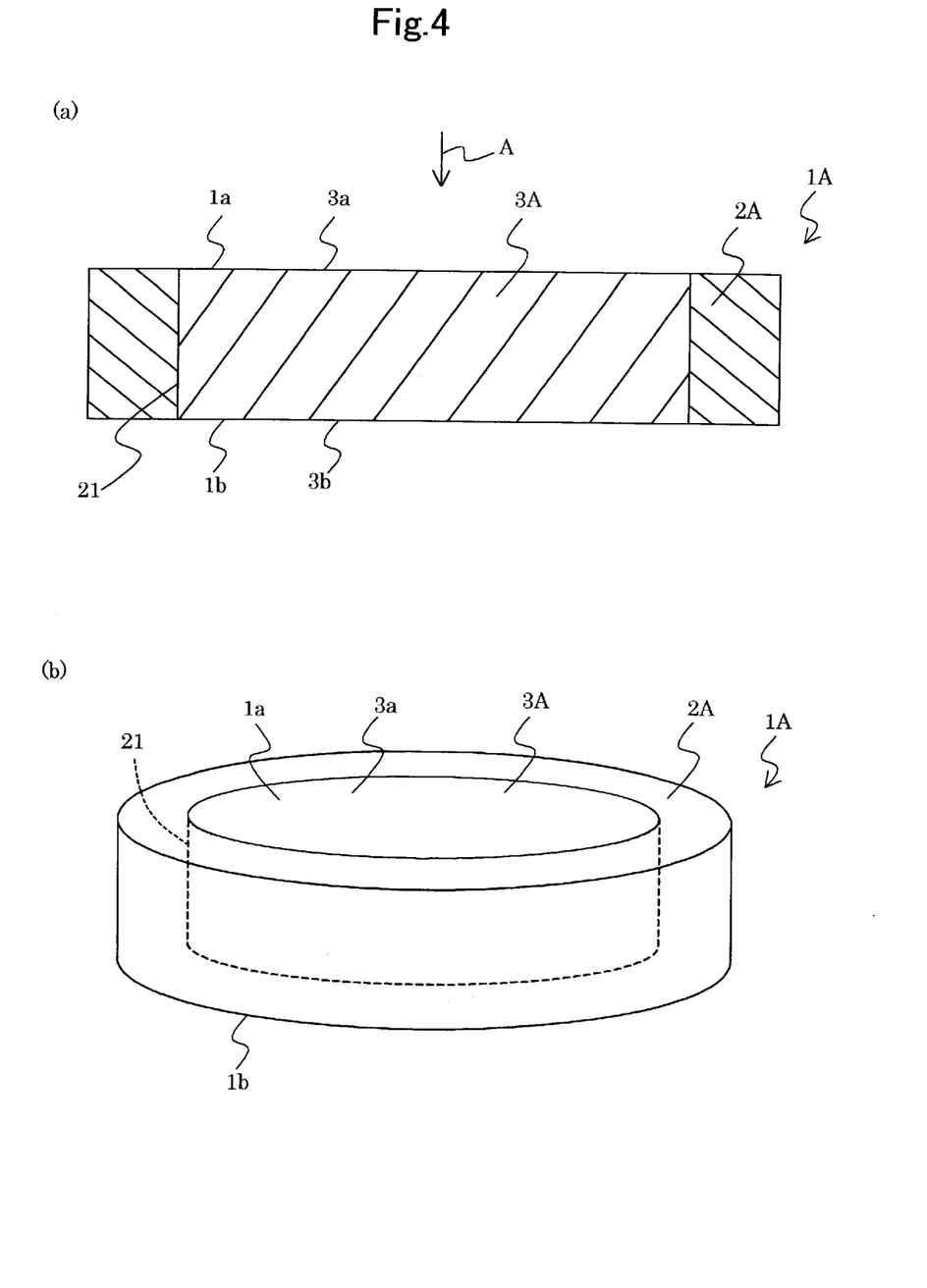
FIG. 4(a) is a cross sectional view showing a sintered body 1A.
FIG. 4(b) is a perspective view showing a sintered body 1A.

The sintered body 1A shown in FIG. 4 was produced according to the same process as the experiment "A."

Alumina or aluminum nitride coarse particles, with properties shown in table 3, were prepared.

TABLE 3

|  | Example 6 | Example 7 | Example 8 |
| --- | --- | --- | --- |
| Raw material | Al2O3 | l2O3 | AlN |
| Coarse particle | WA60 | WA100 | No. 1 |
| Maximum particle Diameter ($\mu$m) | 300 | 150 | 600 |
| Average particle Diameter ($\mu$m) | 250 | 115 | 400 |
| Minimum particle Diameter ($\mu$m) | 210 | 105 | 350 |
| Al2O3 (weight %) | 99.9 | 99.9 | — |
| AlN (weight %) | — | — | 99.9 |
| Free carbon (weight %) | — | — | — |
| SiO2 (weight %) | 0.01 | 0.01 | 0.003 |
| Total iron content (weight %) | 0.01 | 0.01 | 0.001 |
| Application | Abrasive grain | Abrasive grain | — |

The coarse particles were mixed with a solution containing 5 percent of polyvinyl alcohol to obtain paste, which was then filled into a mold (circle), removed from the mold, and dried at 110° C. for two hours to obtain a disk-shaped primary shaped body 7. The primary shaped body 7 was set in a metal mold. Ceramic fine particles 8 of alumina and aluminum nitride, both with a purity of 99.9 percent and average particle diameters shown in Table 4, were filled in the metal mold to cover the side face of the primary shaped body 7. The fine particles and primary shaped body were pressed at a compacting pressure of 200 kg/cm² to obtain a secondary shaped body. The secondary shaped body was subjected to hot press sintering. The maximum temperature during the sintering was changed as shown in Table 4. The holding time period at the maximum temperature was 2 hours. The temperature rising (heating) rate and cooling rate were 100° C. per hour. The sintering was carried out in 100 percent nitrogen.

The sintered body 1A as shown in FIGS. 4(*a*) and 4(*b*) was finally obtained. The porosity and four-point bending strength of each sintered body 1A were measured as described in the experiment "A", and the results are shown in Table 4.

TABLE 4

|  | Example 6 | Example 7 | Example 8 |
| --- | --- | --- | --- |
| Raw material | Al2O3 | Al2O3 | AlN |
| Raw coarse particle | WA60 | WA100 | No. 1 |
| Maximum particle diameter of raw coarse particle ($\mu$m) | 250 | 115 | 400 |
| Average particle diameter of raw fine particle ($\mu$m) | 0.5 | 0.5 | 1 |
| Maximum temperature during sintering (° C.) | 1600 | 1600 | 1850 |
| Pressure during sintering (kg/cm²) | 200 | 200 | 200 |
| Atmosphere for sintering | N2 | N2 | N2 |
| Porosity of porous portion (%) | 27 | 21 | 28 |
| Porosity of dense portion (%) | 0 | 0 | 0 |
| Four point bending Strength (MPa) | 250 | 270 | 230 |

As can be seen from the results, the porous and dense portions of the inventive sintered body were integrated with a high strength.

The microstructure of the interface between the porous and dense portions of each sintered body according to examples 6, 7 or 8 was observed using photographs taken by a scanning electron microscope. The results of the observation were substantially same as the examples 2 and 4 described above.

Next, the dense portion 2A of each sintered body 1A according to examples 6, 7 or 8 was sealed at its end face using an O-ring. One space facing the main face 1*a* was thus separated from the other space facing the bottom face 1*b* by the O-ring. The pressure of helium gas was adjusted at 2 atm in the former space facing the main face 1*a* and was adjusted at 1 atm in the latter space facing the bottom face 1*b*, so as to measure the leakage of helium gas. As a result, gas leakage was not observed through the dense portion 2A. It was thus confirmed that gas passed through the disk-shaped porous portion 3A from the main face 3*a* to the bottom face 3*b*.

As described above, a porous ceramic material and a dense ceramic material may be integrated with a sufficiently high strength according to the invention.

Moreover, it is not necessary to use solders or adhesives for bonding the porous and dense ceramic materials.

When applying a raw ceramic material with a high purity for producing a porous portion and /or dense portion in the inventive sintered body, such sintered body has the following three features. That is, the porous and dense portions are integrated with a sufficiently high strength, the body has at least one portion with a high purity, and the body does not need a solder or adhesive. Such a sintered body may be useful and advantageous as a member or an article for a semiconductor producing system (for example, a shower plate) or a filter.

What is claimed is:

1. A ceramic sintered body comprising a dense portion comprising ceramic fine particles, and an integral porous portion comprising ceramic coarse particles, said fine particles and said coarse particles comprising the same kind of ceramic material;

wherein said ceramic fine particles and said ceramic coarse particles are simultaneously sintered and integrated in a single pressure sintering step to form said dense portion and said integral porous portion of said sintered body; and wherein said dense portion and said porous portion directly contact each other.

2. A ceramic sintered body comprising a dense portion comprising ceramic fine particles, and an integral porous portion comprising ceramic coarse particles;

wherein said ceramic fine particles and said ceramic coarse particles are simultaneously sintered and integrated in a single pressure sintering step to form said dense portion and said integral porous portion of said sintered body;

wherein said dense portion and said porous portion directly contact each other; and wherein said fine particles and said coarse particles comprise silicon carbide.

3. A ceramic sintered body comprising a dense portion comprising ceramic fine particles, and an integral porous portion comprising ceramic coarse particles;

wherein said ceramic fine particles and said ceramic coarse particles are simultaneously sintered and integrated in a single pressure sintering step to form said dense portion and said integral porous portion of said sintered body;

wherein said dense portion and said porous portion directly contact each other; and wherein said fine particles and said coarse particles comprise an aluminum compound.

4. The sintered body of claim 1, wherein said dense portion has a porosity of not higher than 10 percent and said porous portion has a porosity in a range of 10 to 40 percent.

5. The sintered body of claim 1, wherein said dense portion is laminated with said porous portion in the direction in which pressure is applied during said pressure sintering step to form an integrally sintered body.

6. The sintered body of claim 1, wherein said ceramic sintered body further comprises an interface between said dense portion and said integral porous portion, wherein at least a part of said interface is substantially parallel with the direction in which pressure is applied during said pressure sintering step.

* * * * *